(No Model.)
W. P. SIMONDS.
SAFETY ATTACHMENT FOR HORNED CATTLE.
No. 325,021. Patented Aug. 25, 1885.
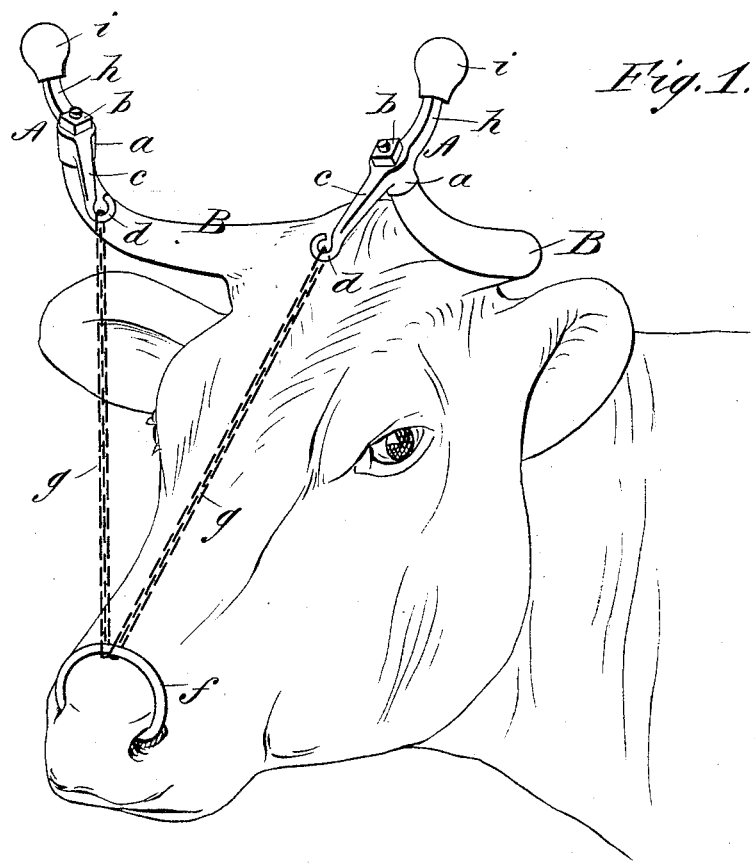
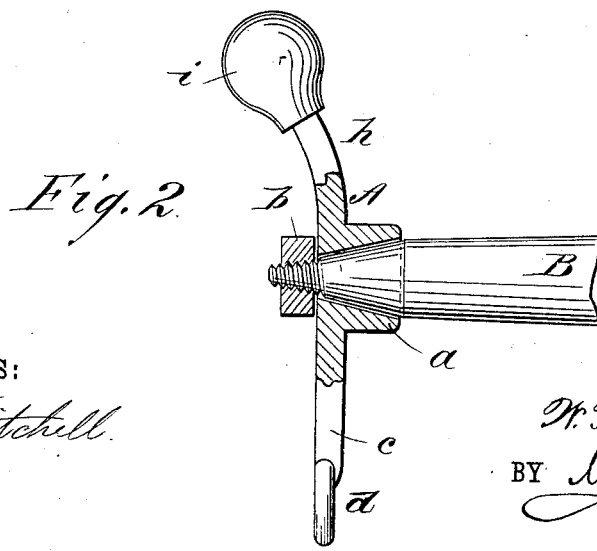
WITNESSES:
Donn Twitchell
C. Sedgwick
INVENTOR:
W. P. Simonds
BY Munn & Co.
ATTORNEYS.
N. PETERS, Photo-Lithographer, Washington, D. C.

United States Patent Office.

WILLIAM P. SIMONDS, OF COMPETINE, IOWA.

SAFETY ATTACHMENT FOR HORNED CATTLE.

SPECIFICATION forming part of Letters Patent No. 325,021, dated August 25, 1885.

Application filed Novemb r 6, 1884. (No model.)

*To all whom it may concern:*

Be it known that I, WILLIAM P. SIMONDS, of Competine, in the county of Wapello and State of Iowa, have invented a new and Improved Safety Attachment for Horned Animals, of which the following is a full, clear, and exact description.

Reference is to be had to the accompanying drawings, forming a part of this specification, in which similar letters of reference indicate corresponding parts in both the figures.

Figure 1 is a perspective view showing the application of my invention; and Fig. 2 shows in sectional elevation one of the levers as it appears secured to the horn of the animal.

The invention will first be described in connection with the drawings and then pointed out in the claim.

A A represent duplicate levers, one for each horn of the animal. These levers A are each formed with a central conical socket or cavity, $a$, to fit upon the horn B of the animal, as shown clearly in Fig. 2, where the lever may be held by a nut, $b$, screwed upon the end of the horn. From the central socket, $a$, the levers A are each formed with a downwardly-projecting arm, $c$, which is bent to form an eye, $d$. These eyes $d$ are connected to the nose-ring $f$ by the chains $g\ g$. From the socket $a$ the levers A are each formed also with an arm, $h$, that reaches upward and slightly forward from the socket, as shown clearly in Fig. 2, so that when the levers A are applied to the horns of an animal the arms $h$ will stand in front and to the outside of the horns, where the arms will first be presented to any object, other animal, or person attempted to be meddled with or gored, and the extremities of the arms $h$ are by preference each provided with a ball, $i$, of metal, rubber, wood, or similar material, so that no damage can be done by the animal with the levers A.

The levers being applied to the horns of an animal and connected to the nose-ring $f$, and the levers being centrally fulcrumed upon the horns, it will be seen that any motion of the levers caused by any attempt of the animal to use its horns will be communicated to the nose-ring $f$ and cause pain, and this will cause the animal to desist, and the attachment will thus soon break the animal of any habit or desire to use its horns.

Having thus described my invention, I claim as new, and desire to secure by Letters Patent—

The levers A, formed with central conical socket, $a$, and arms $c$ and $h$, the latter reaching forward of the socket, in combination with chains $g\ g$ for connecting the lower ends of the levers to the nose-ring $f$, the arms $c\ h$ being formed with the rings $d$ and ball $i$, substantially as and for the purposes set forth.

WILLIAM P. SIMONDS.

Witnesses:
 H. W. ROBERTS,
 N. M. IVES.